United States Patent [19]

Blasius

[11] 4,156,654

[45] May 29, 1979

[54] METHOD FOR MAKING CRUDE BORIC ACID FROM BORATE AND SULFURIC ACID

[76] Inventor: James R. Blasius, 5219 N. 24th St., Apt. 201, Phoenix, Ariz. 85016

[21] Appl. No.: 892,157

[22] Filed: Mar. 31, 1978

[51] Int. Cl.$^2$ .............................................. C09K 3/28
[52] U.S. Cl. ...................................... 252/8.1; 423/283
[58] Field of Search ........................... 252/8.1; 423/283

[56] References Cited

U.S. PATENT DOCUMENTS 3,917,801 11/1975 Wilson ................................. 423/283

FOREIGN PATENT DOCUMENTS 631217 4/1963 Belgium .................................... 423/283

Primary Examiner—Leland A. Sebastian

Attorney, Agent, or Firm—Merchant, Gould, Smith, Edell, Welter & Schmidt

[57] ABSTRACT

For the conversion of sodium tetraborate (e.g. "5 mole borax" or sodium tetraborate pentahydrate) to a solid, particulate mass of flame-retardant chemical, a slurrying amount of water (e.g. 3-5 moles per mole of tetraborate) is first added, so that a stable slurry can be formed. Then 0.95 to 0.98 mole of sulfuric acid is added to the slurry, and the tetraborate is substantially converted to a moist, particulate mixture of boric acid and sodium sulfate, the water in the slurry having been largely driven off as steam. The moist particulate mixture is suitable for imparting flame retardency to cellulosic insulation; preferably, however, it is first dried to <20 wt.−% moisture.

9 Claims, No Drawings

METHOD FOR MAKING CRUDE BORIC ACID FROM BORATE AND SULFURIC ACID

1. Field of the Invention

This invention relates to a method for converting a sodium tetraborate such as sodium tetraborate pentahydrate to a solid, particulate fire retardant mixture containing boric acid and sodium sulfate. An aspect of this invention involves a method for making a fire retardant mixture suitable for use in the manufacture of flame-retarded cellulose insulation. Another aspect of this invention relates to the preparation of a boric acid/sodium sulfate mixture in which degradation of the boric acid to $HBO_2$ and the like is minimized.

2. Description of the Prior Art

As a result of increasing cost of energy and dwindling supplies of petroleum, interest in thermal insulation as an energy-saving device has become a matter of government policy. In addition, high volume manufacture of insulation materials has become a top priority matter in most industrialized countries.

One of the most effective types of insulation material is made from some form of cellulose — a particularly inexpensive source of cellulose being scrap newsprint and the like. Cellulose, of course, is flammable, and fire retardant properties are typically imparted to the cellulose by means of treatments with fire retardant chemicals. Boric acid (or boric acid in conjunction with borax) is presently a flame-retarding chemical which is in commercial demand. Reports indicate that the demand, e.g. in the United States may exceed the supply for some years to come. A typical discussion of the demand for increased boric acid output can be found in the article entitled "Boron Chemicals Markets Catch Fire" in *Chemical Week*, June 29, 1977, pages 29 and 30.

It is presently difficult to predict the rate at which boric acid production will grow. There are other uses for boron chemicals besides insulation, and the rate of ingrowth of the insulation market is so abnormally large as to make projections difficult. However, at least for the short term (say over the next few years), any means for improving the efficiency of boric acid production will probably be welcomed by the insulation industry.

Borate-containing ores can be mined by relatively straightforward techniques. Some of these ores contain hydrates of sodium tetraborate in a relatively high state of purity. Commercial processing of these ores can provide sodium tetraborate pentahydrate or the corresponding decahydrate or other stable hydrates in so-called commercial grades exceeding 99% by weight of purity. The abundance and relative degree of purity of sodium tetraborate hydrates has been a great boon to the boron chemicals industry. Sodium tetraborate is easily hydrolyzed with water and acid to form orthoboric acid ($H_3BO_3$), hereinafter referred to as "boric acid". Tetraboric and metaboric acid may also be formed in small quantities during the aforementioned hydrolysis process. These by-products and other by-products which can be considered to be degradation products of boric acid are less preferred by the insulation industry; the prime candidate for fire retardant compositions applied to cellulose is boric acid itself, alone or in admixture with borax (sodium tetraborate decahydrate).

Readily available mineral acids such as sulfuric acid work well in the hydrolysis of sodium tetraborate to boric acid, the principal products of the hydrolysis being $H_3BO_3$ and sodium sulfate. The sulfuric acid/sodium tetraborate reaction has been practiced on a large industrial scale for many years.

Unfortunately, sodium sulfate is of minimal value in a fire retardant composition. Accordingly, the traditional approach to the manufacture of boric acid for insulation purposes has involved the separation of sodium sulfate from the reaction mixture. The sodium sulfate can be sold as a by-product, and the resulting, relatively pure boric acid is an excellent fire retardant chemical. It would nevertheless be advantageous if the conventional step of separating the sodium sulfate from the boric acid could be eliminated.

Furthermore, the conventional practice has involved the use of dilute solutions of sulfuric acid and/or sodium tetraborate, necessitating a very cumbersome drying procedure. Substantial savings could be realized if highly concentrated solutions or the like could be utilized.

The following patents are believed to be representative examples drawn from a body of patent literature disclosing manufacture of boric acid and the use of boric acid or the like in fire retardant compositions:

U.S. Pat. No. 2,113,248 (Berg), issued Apr. 5, 1938;
U.S. Pat. No. 2,948,592 (May), issued Aug. 9, 1960;
U.S. Pat. No. 1,950,106 (Franke), issued Mar. 6, 1934;
U.S. Pat. No. 1,804,417 (Herting), issued May 12, 1931;
U.S. Pat. No. 3,650,690 (Shiloff), issued Mar. 21, 1972.

In relatively recent years, it has been suggested that the step of separating sodium sulfate from boric acid, in a reaction product derived from borate ores by hydrolysis can be eliminated. The resulting impure boric acid-containing mixture is said to be adequate as a fire retarding or flame-retarding composition. See U.S. Pat. No. 3,983,040 (Draganov), issued Sept. 28, 1976. Draganov also suggests that borate ore can be converted to the impure boric acid-containing mixture in a process involving the formation of an aqueous slurry. (That is, Draganov apparently contemplates a hydrolysis technique which does not involve the traditional use of dilute solutions.) In the Draganov process, the acid (e.g. sulfuric acid) is added while the ore is being agitated, and the mixing of the ore and acid is continued while water is being added to the mix. The addition of the water thus takes place during a final mixing stage. Beneficiation of the ore prior to processing is said to be unnecessary, even though the ore (e.g. calcium borate ore) may contain minor amounts of impurities such as limestone.

The applicant has found that, in actual industrial practice, it is extremely difficult to add sulfuric acid directly to a beneficiated material such as a "commercial" grade of a sodium tetraborate hydrate. Local excesses of acid over borate produce poorly controlled results. The heat (exotherm) produced by the reaction of the sulfuric acid and the borate can, if not properly controlled, result in the formation of at least some undesirable by-products such as $HBO_2$, which is less effective in imparting flame-retardant characteristics to cellulose.

SUMMARY OF THE INVENTION

It has now been found that, for the conversion of sodium tetraborate to a solid, particulate flame-retardant mixture containing solid, particulate boric acid and sodium sulfate by an aqueous slurry process, it is essential that a slurrying amount of water be added first (before the acid) and that the amount of sulfuric acid added to the slurry must fall within a critical range, i.e. about 0.95 to about 0.98 mole of sulfuric acid per mole of sodium tetraborate. If these conditions are properly maintained, quality control over the fire-retardant product is adequate for full-scale industrial use in the manufacture of flame-retarded cellulosic insulation. A typical slurrying amount of water ranges from about 3 to about 10 moles per mole of sodium tetraborate. Even at elevated temperatures such as 100° C., 10 moles of water will not dissolve all of a sodium tetraborate such as $Na_2B_4O_7 \cdot 5H_2O$; accordingly, a considerable mass of sodium tetraborate particles will be suspended in the water, thus forming the slurry. The sulfuric acid is preferably added gradually to the slurry, e.g. over a period of up to about 60 minutes. Formation of undesirable by-products is avoided by keeping the temperature of the reaction mixture below 175° C. and preferably below 150° C., although temperatures above 100° C. are advantageous in that the water in the slurry will be driven off, leaving behind a particulate or granular, moist residue which is suitable for packaging as a boric acid substitute. Preferably, the packaging is delayed until the product has been dried to a moisture content below about 20% by weight, e.g. 15–18% by weight. This dried product typically contains 30 to 40% by weight $B_2O_3$ (essentially of boric acid) and 30 to 40% by weight of sodium sulfate. The method of this invention can be carried out semi-continuously through alternating use of a plurality of mixers (e.g. ribbon blenders).

DETAILED DESCRIPTION

In the description which follows, the raw materials and the method of converting them to a fire-retardant mixture will first be described, followed by a description of the resulting fire retardant mixture itself. Methods for utilizing the fire retardant mixture are known in the art. In essence, the mixture produced by the method of this invention can be substituted for boric acid in the manufacture of Class 1 insulation. The substitution may or may not be on a weight-for-weight basis; most typically, it will require more of the crude boric acid (i.e. the sodium sulfate/boric acid mixture) to equal the performance of boric acid itself, since sodium sulfate is not particularly effective as a fire retardant chemical.

In one typical prior art formula, cellulosic insulation is flame-retardant by treatment with a mixture of one part boric acid with three parts borax. To calculate the equivalent amount of boric acid/sodium sulfate mixture, the bench mark is the boric oxide ($B_2O_3$) content. As noted previously, some of the boric acid may be in the form of $HBO_2$ or other chemicals. Thus, an invariant yardstick for any boric acid-containing composition is the boric oxide content.

The properties of boric acid can be influenced by the presence of certain other substances, including chlorides, nitrates, sulfates, and borax. For example, borax raises the solubility of boric acid due to the formation of sodium polyborates. Boric acid itself theoretically contains 56.30% boric oxide and 43.70% water. When heated above 100° C. in the open, boric acid gradually loses water, first changing to metaboric acid ($HBO_2$), of which 3 monotropic forms exist. Dehydration stops at the composition $HBO_2$ unless the time of heating is extended or the temperature raised above 150° C. On continued heating at higher temperatures, all water is removed leaving the anhydrous oxide, $B_2O_3$. Boric acid is stable at ordinary temperatures.

Although a major focus of this application will be directed toward a method for making the aforementioned sodium tetraborate/sodium sulfate mixture, it should be understood that the mixture need not be used as is and can, if desired, be separated into its boric acid and sodium sulfate components. However, insofar as any separation step involves the use of a large volume of water (e.g. separation techniques taking advantage of differences in solubility between the two components), some of the advantages of the aqueous slurry (as opposed to dilute solution) feature of the process will be lost.

The raw materials used in the process will now be discussed in detail.

SODIUM TETRABORATE

The compound sodium tetraborate occurs in a variety of forms, including a variety of hydrates. Two of the commonest states of hydration (from a commercial availability standpoint) are the pentahydrate, $Na_2B_4O_7 \cdot 5H_2O$ and the decahydrate, $Na_2B_4O_7 \cdot 10H_2O$. The term "borax" usually refers to the decahydrate, although the terms "5 mole borax" and "10 mole borax" are sometimes used to denote the pentahydrate and the decahydrate.

The pentahydrate has many advantages over the decahydrate. First, it can be considered to be a more "concentrated" form of sodium tetraborate. Second, it reacts somewhat faster with sulfuric acid in the method of this invention. Third, better quality control can oftentimes be obtained with the pentahydrate. It is particularly worth noting that even the so-called "commercial" grades of the pentahydrate are purer than some laboratory grade chemicals. Technical grade "5 mole" borax typically contains no more than about 0.05% chloride, 0.08% sulfate, and 0.004% iron oxide ($Fe_2O_3$). A purity of 99.85% or better is thus obtainable on a large commercial scale. Obtaining "5 mole borax" of 99% purity or greater is certainly no problem.

When heated in a closed space, sodium tetraborate pentahydrate melts in its own water at temperatures below 200° C. In the open, however, it loses water of crystallization below that temperature without liquefying. With continued heating in the open, and increasing temperatures, dehydration proceeds until anhydrous sodium tetraborate is formed. Published data indicate that, at about 58° or 59° C., the pentahydrate is converted to "kernite", i.e. sodium tetraborate tetrahydrate. Such in situ conversion has no adverse effect upon the practice of this invention. Indeed, kernite can also be used as a starting material in this invention; however, from a commercial standpoint, it is ordinarily easier to use the pentahydrate as the initial starting material. Once dissolved, there is little or no difference between the various hydrates of sodium tetraborate — all produce sodium tetraborate solutions.

The solubility of sodium tetraborate pentahydrate in water is highly temperature dependent. At 0° C., the percent of pentahydrate by weight of saturated solution is reported to be 1.52%. At 20° C., a saturated solution is reported to be 3.6%, and at 25° C., 4.44%. Starting at about 45° C., the solubility of the pentahydrate begins to increase fairly rapidly until it reaches about 50% at 100° C. The boiling point of a saturated solution of the pentahydrate is reported to be 102.8° C., at which temperature the percent of pentahydrate by weight of saturated solution is 53.17%. Thus, there are more than 15 moles of water to every mole of the pentahydrate in a boiling, saturated solution. If one uses less than 15 moles of water per mole of pentahydrate (as is the case in this invention), it follows that at least some of the sodium tetraborate will be suspended in water as undissolved particles. There is no absolute upper limit on the amount of water used to form a slurry of sodium tetraborate according to the teachings of this invention; however, there most certainly is a practical limit. Many of the advantages of this invention will not be obtained if more than 15 moles of water per mole of sodium tetraborate are used to form the reaction medium (exclusive of any water contained in the sulfuric acid added to the reaction medium).

To obtain a reasonably uniform slurry of sodium tetraborate particles in less than 15 moles of water per mole of sodium tetraborate, it is desirable to select a finely divided (e.g. powdered or granular) form of sodium tetraborate (or hydrate thereof). Alternatively, one may screen off oversize particles from a relatively course particulate form. Generally speaking, by "finely divided" is meant particles which pass a 3 U.S. mesh screen, and preferably up to 100% of such particles should pass an 8 mesh screen (U.S.). Fortunately, even the granular form of sodium tetraborate pentahydrate is commercially available in the 100%−8 U.S. mesh particle size range. This "5 mole" hydrate is also available in the following particle sizes shown by U.S. Standard Sieve Analysis (according to available trade literature):

| Type | U.S. Standard Sieve No. | Percent (wt.) Cumulative |
|---|---|---|
| "Type B" | +16 | trace |
|  | +200 | at least 90% |
| "Type F" | +70 | 2% maximum |
|  | +200 | at least 50% |
| Powdered | +70 | 8% maximum |

SULFURIC ACID

Commercial grades of sulfuric acid can be used. Advantageously, relatively concentrated grades can be used, including those containing more than 90% sulfuric acid, substantially the balance being water. In accordance with the usual practice followed in the manufacture of boric acid from borax and sulfuric acid, 66° Baume sulfuric acid can be employed, which is reported to have a specific gravity of 1.8354 and to contain 93.19% sulfuric acid. The amount of sulfuric acid used in the method of this invention is believed to be critical and should not exceed about 0.98 moles per mole of sodium tetraborate. The minimum amount of sulfuric acid used should be about 0.95 moles. Optimum results are achieved with 0.95-0.975 moles per mole of sodium tetraborate.

Preferably, the active starting materials used in the process of this invention are only the sodium tetraborate (or hydrate thereof) and the sulfuric acid. As noted previously, some water is included in the reaction mixture to form a generally uniform distribution of the sodium tetraborate through the slurry-like reaction medium. Ordinarily, the amount of water will be at least about 3 moles per mole of sodium tetraborate. Distilled and/or deionized water can be used for an extra measure of quality control, but ordinary tap water is suitable in virtually all localities, even in those places where the water is moderately hard or contains iron.

THE METHOD

The method of this invention can be practiced on either a semi-continuous or a batch basis. In the semi-continuous technique, a plurality of reaction zones (e.g. mixing or agitation zones) is employed, so that, for example, one zone can be discharging its moist, fire-retardant product into a drying zone while a new batch of product is in preparation. Through alternating use of the reaction or mixing or agitation zones, which typically would be ribbon blenders or the like, there is always a blender available to receive starting material and always a blender discharging or about to discharge moist product. The practice of this technique is tantamount to continuous production from a continuous starting material stream and is therefore greatly preferred for high-volume production of the boric acid/sodium sulfate mixture.

In the batch technique, a single blender or agitation zone will suffice.

As is known in the art, there are many other techniques for providing semi-continuous production besides the alternating use of reaction zones. Any technique which preserves the order of addition of materials required by this invention can be used. Conversely, it is ordinarily not advisable to simply meter the sodium tetraborate, sulfuric acid, and water in predetermined proportions into a reaction zone, since a significant feature of the process of this invention is its quality control, and proper quality control is presently believed to be dependent upon the formation of a reasonably stable slurry of the sodium tetraborate in water prior to the addition of sulfuric acid. Thus, any purely continuous process which sought to achieve the required order of addition would ordinarily have to provide for in-line mixing of water and sodium tetraborate "upstream" from the introduction of sulfuric acid. In view of the addition times and reaction times which are customarily preferred in this invention, the equipment needed for continuous in-line mixing followed by addition of sulfuric acid followed by transport through a reaction zone, release of steam, and discharge into a dryer might become rather cumbersome. With alternating use of mixers or blenders, however, the arrangement and operation of the equipment is considered to be very straightforward.

As noted previously, the reaction between sulfuric acid and sodium tetraborate is exothermic. The heat of reaction (exotherm) is useful in this invention, provided that the temperature of the contents of the reaction zone or agitation zone or blender is kept below 175° C., more preferably below 150° C. The apparent $B_2O_3$ content of the product may be unaffected by reaction temperatures above, say, 175° C., but the actual effectiveness of the product may suffer, particularly with respect to its ability to penetrate cellulosic materials. In view of the exothermic nature of the reaction, the reaction zone (which, in the semi-continuous process, would preferably also be the zone in which the sodium tetraborate slurry is formed) need not be heated. Indeed, one preferred practice of this invention is to provide a blending/reaction zone (such as the interior of a ribbon blender) with a cooling means such as a water jacket through which ambient temperature water is circulated. Thus, the aqueous slurry of sodium tetraborate can be formed in the cold, e.g. at ambient indoor or outdoor temperatures. Such ambient temperatures can be near room temperature (20°–25° C.) or lower. Temperatures as low as 0° C. would not result in freezing of the slurry, since the sodium tetraborate will have a freezing point-depressing effect. However, there does not appear to be any advantage in initiating the mixing of the water and the sodium tetraborate at temperatures below room temperature.

The first step of the process of this invention thus normally comprises the addition of a slurrying amount of water to sodium tetraborate. Typically, the sodium tetraborate is blended with water in a blending zone, e.g. the interior of a ribbon blender. In the semi-continuous process utilizing alternating blending zones, the typical practice is to introduce the sodium tetraborate into the zone first, followed by the introduction of the slurrying amount of water. Agitation (e.g. with mixing blades or the like) can take place all throughout the introduction of the sodium tetraborate and the water — indeed, all throughout the process, at least up to the point where the moist, particulate product is discharged to a dryer. (In short, agitation can be continuous, and there does not appear to be any need to start and stop the action of the blender.) As is known in the art, good control over the amounts of raw materials added to a blender can be achieved through manipulation of the addition time. Precise amounts of liquid can be added with a metering pump by controlling the time that the metering pump is operating, i.e. through intermittent operation of the metering device for predetermined times. For solid materials, similar control can be achieved with augurs and/or gravity feed controlled by intermittent opening and closing of a door in a hopper. In one known technique, a holding bin with a given capacity can be used to measure out reasonably accurate increments of sodium tetraborate.

In one preferred practice of this invention, the desired increment of sodium tetraborate is added to the mixer or blender followed by addition of a slurrying amount of tap water (preferably a predetermined amount) over a period of a few minutes, all accompanied by agitation. The stage is then set for gradual addition of the required predetermined amount of sulfuric acid, followed by a mixing period during which water is driven off from the reaction mixture as steam or water vapor, and a free flowing mass of moist particles is obtained.

A "slurrying amount" of water is an amount sufficient to provide a continuous aqueous suspension medium. As noted previously, this amount of water is not sufficient to completely dissolve the sodium tetraborate. However, the amount of water should be sufficient to provide a reasonably uniform slurry, i.e. a slurry through which undissolved particles of the sodium tetraborate are uniformly distributed. One test for the uniformity of a slurry would involve taking aliquots from different portions of the slurry and measuring the concentration of the sodium tetraborate (dissolved and undissolved). Variations should be minor — e.g. within a few percent by weight.

As noted previously, the sulfuric acid (added in an amount ranging from about 0.95 to about 0.98 moles per mole of sodium tetraborate in the slurry) reacts exothermically with the sodium tetraborate. The reaction exotherm, if properly managed, results in driving off a significant amount of water in the continuous aqueous suspension medium (i.e. the medium formed and in existence at the time of the addition of sulfuric acid).

The driving off of water amounting to more than 10% by weight of the total reaction medium (including water) can be readily achieved in practice; typical water losses can amount to 20 or 30% or even slightly more, depending upon how much water was used to make the slurry initially. As a result of this water loss, the aforementioned continuous aqueous suspension medium becomes discontinuous and is eventually converted to a mere moisture residue on discrete particles of the boric acid/sodium sulfate mixture. These moist but discrete particles generally comprise a free-flowing mass of particles or granules which can be discharged from the blending zone or reaction zone without special or complex removal procedures. In fact, this moist, particulate mass could be a useful item of commerce as is. The residual moisture on the particles can have a caking effect, however, and it is particularly preferred to reduce the moisture content of the particulate product mass to a level below about 20% by weight. Reduction of the moisture content below 15%, however, is ordinarily not necessary for non-caking properties. The non-caking boric acid/sodium sulfate mixture (which normally contains at least 30% by weight $B_2O_3$, generally as boric acid) is suitable for packaging and sale as a fire or flame-retarding chemical.

The various steps of the process will now be discussed in more detail.

SLURRY FORMATION AND REACTION WITH ACID

Suitable slurries can be formed by blending substantially —3 U.S. mesh particles (preferably 100% —8 U.S. mesh) of sodium tetraborate with less than 15 moles of water per mole of sodium tetraborate. It is preferred to use the smallest amount of water which will produce a uniform, stable slurry, and this amount presently appears to be about 3 moles. To be on the safe side (i.e. to insure good quality control), more water can be used, e.g. 5 moles. There presently appears to be no particular advantage in using more than 10 moles of water.

When the aqueous slurry is formed, it is not ordinarily necessary to use pre-heated water, since the heat of reaction will drive the temperature of the reaction zone above 100° C., even when liquid water of normal ambient temperature is introduced into the blender to make the slurry. Furthermore, in the semi-continuous process and in the batch process, some residual heat may remain in the reaction zone, thereby warming the water as soon as it is introduced. As noted previously, the blending zone should not at any time be allowed to get so warm as to cause the formation of undesirable by-products. Such undesirable results can be avoided if the temperature of the blending zone is generally below 175° C., preferably below 150° C. The initial temperature at the beginning of the blending step will ordinarily be lower than the temperature of the product discharged into the dryer.

Metering of the sulfuric acid (e.g. a 90–100 weight-% sulfuric acid) into the aqueous slurry can take place over a period of 1–60 minutes, e.g. about 10 minutes. (A 10-minute addition period is also typical for the addition of the water to the sodium tetraborate, using an average size blender.) When addition of the sulfuric acid has been completed, agitation or mixing of the reactants can and preferably does continue for a period of time — again, several minutes, e.g. 30 minutes. A typical peak heat of reaction for the reaction zone is about 115° C. (238 or 239° F.).

DRYING

The moist but free-flowing product produced by the batch or semi-continuous process can be dried with mildly elevated temperatures, e.g. in a rotary dryer. Suitable air inlet temperatures for the dryer can range from 90° C. to about 150° C., depending upon the time allotted for drying. Efficient drying with minimal formation of undesired by-products can be obtained with an air inlet temperature on the order of 115°–125° C. (roughly 240°–260° F.). It is generally preferred that the product temperature not significantly exceed 100° C. during the drying step; indeed, adequately efficient drying can be obtained at 120° F. It is particularly undesirable to permit the sodium sulfate/boric acid mixture to approach or exceed 150° C., due to the possibility that $HBO_2$ or $NaBO_2$ may be formed.

SCREENING

A major amount of the moist particles discharged from the blending zone will pass a 3 mesh (U.S.) screen. Oversize particles can be ground or pulverized. A −3 mesh product is commercially useful and saleable. A finer state of subdivision can of course be provided by techniques well known in the art.

CRUDE BORIC ACID (THE FLAME-RETARDING BORIC ACID/SODIUM SULFATE MIXTURE)

When 0.95–0.975 mole of sulfuric acid is added to an aqueous slurry containing a mole of sodium tetraborate pentahydrate in 3–5 moles of water, a typical analysis of the crude reaction product produced accordng to this invention is as follows:
   Boric oxide: 38.06 wt.-%
   Anhydrous sodium sulfate: 34.32 wt.-%
   pH of a 2% by weight solution at 23° C.: 7.56
Typical physical properties are as follows:
   Appearance: white powder or granular
   Specific gravity (water equals 1.0): 1.4
   Solubility in water: 15 grams per 100 ml The product has a very slight odor. It is preferably packaged in multi-wall paper bags with a moisture-free liner. Packaging in 100-lb. (net) bags is ordinarily preferred.

In the following illustrative, non-limiting Examples, all parts and percentages are by weight unless otherwise indicated.

EXAMPLE 1

Sodium tetraborate pentahydrate was augered from a storage silo into a holding bin and then elevated into one of two 300 cubic foot ribbon blenders. The amount of pentahydrate used to make this first batch of product was 7,503 lbs. A metering pump introduced 1,838 lbs. of water into the ribbon blender over a period of 10 minutes, during which time a stable, uniform slurry was formed. A second meter pump introduced 2,626 lbs. of 66° Be. sulfuric acid into the ribbon blender, and the resulting slurry of water, sulfuric acid, and pentahydrate generated steam. Introduction of the sulfuric acid took 10 minutes, and the mixing continued for another 30 minutes until the slightly damp product was obtained. Seventy percent of the boric acid/sodium sulfate mixture passed a ¼ inch screen into a steam-heated rotary dryer for removal of 15% moisture. The 30% oversize particles were ground and then introduced directly into the rotary dryer. A dust collector recovered 11.5% of the total product emerging from the dryer.

Identical proportions of raw materials were placed inside a second ribbon blender following initiation of the mixture in the first ribbon blender, thereby providing the aforementioned semi-continuous process.

EXAMPLE 2

The procedure in this Example was the same as in Example 1, except that the following amounts were used:

| | |
|---|---|
| "5 mole borax" (sodium tetraborate pentahydrate) | 8,000 parts by weight |
| Tap water | 1,950 parts by weight |
| 66° Be. sulfuric acid | 2,770 parts by weight |

The molar rations, in this Example, were calculated and found to be 0.96:3.95:1 ($H_2SO_4$:$H_2O$:"5 mole borax"). Thus, the molar amounts of both sulfuric acid and water were somewhat less in this Example as compared to Example 1; however, the process was fully operative using these slightly lowered ratios. By contrast, if the sulfuric acid:borax molar ratio is raised to 1:1 or more, serious quality control problems are encountered.

EXAMPLE 3

The purpose of this Example was to explore the effect of using slightly more water and slightly less sulfuric acid as compared to Example 2. No serious adverse effects were noted. The amounts used were as follows.

| | |
|---|---|
| 5-mole borax | 8,000 parts by weight |
| Tap water | 1,960 parts by weight |
| Sulfuric acid | 2,760 parts by weight |

What is claimed is:

1. A method for converting sodium tetraborate to a solid, particulate fire retardant mixture containing solid, particulate boric acid and sodium sulfate, said method comprising the steps of:
   a. adding a slurrying amount of water to said sodium tetraborate, said slurrying amount being sufficient to suspend substantially −3 U.S. mesh particles of sodium tetraborate in a uniform slurry comprising a continuous aqueous suspension medium but not sufficient to completely dissolve said sodium tetraborate, said amount of water being less than about 15 moles per mole of sodium tetraborate;
   b. agitating the undissolved particles of sodium tetraborate so as to form a uniform aqueous slurry of said particles;
   c. adding to said aqueous slurry about 0.95 to about 0.98 moles of sulfuric acid per mole of said sodium tetraborate, thereby obtaining said fire retardant mixture, and permitting the resulting exotherm to drive off sufficient water vapor from said continuous aqueous suspension medium to convert said medium to a moisture residue on discrete particles of said fire retardant mixture.

2. A method according to claim 1 comprising the steps of:
   a. blending, in a blending zone, about 3 to about 10 moles of water with each mole of said sodium tetraborate, said sodium tetraborate being a hydrate having 5 to 10 moles of water of hydration;

b. forming a said uniform aqueous slurry in said blending zone, said blending zone having an initial temperature, at the beginning of said blending step, below 175° C.;

c. adding to said uniform aqueous slurry, over a period of 1–60 minutes, less than 0.98 moles of sulfuric acid per mole of said sodium tetraborate;

d. maintaining the temperature of the mixture resulting from said step (c) at a temperature above 100° C. but below 175° C.;

e. drying the said fire retardant mixture to recover a generally dry, free-flowing particulate fire-retardant mass containing sodium sulfate and at least 30% by weight $B_2O_3$, generally as boric acid, and having a moisture content below about 20% by weight.

3. A method according to claim 2 comprising the further step of packaging said dry, free-flowing particulate mixture without further drying and without separation of said sodium sulfate from said boric acid.

4. A method according to claim 2 wherein:

a. the amount of water added in said step (a) is 3–5 moles per mole of said sodium tetraborate; said sodium tetraborate being sodium borate pentahydrate of greater than 99 weight-% purity;

b. the formation of said aqueous slurry is carried out semi-continuously by utilizing a plurality of mixing zones, whereby formation of a first batch of said aqueous slurry is completed in a first mixing zone before completion of formation of a second batch of aqueous slurry in a second mixing zone;

c. said sulfuric acid is added to said aqueous slurry in each said mixing zone, accompanied by agitation of said aqueous slurry, over a period of time longer than 5 minutes and agitation of the resulting mixture is continued after addition of said sulfuric acid has been completed; and d. the said temperature of said mixture is kept below about 150° C. by cooling said mixing zones at least during said step (c).

5. A method for making an essentially dry, free-flowing particulate mixture consisting essentially of boric acid, a generally negligible amount of boric acid degradation products, and sodium sulfate, said method comprising the steps of:

a. introducing sodium tetraborate pentahydrate into a mixing zone;

b. introducing 3 to 10 moles, per mole of said pentahydrate, of liquid ambient temperature water into said mixing zone over a period of 1 to 60 minutes, whereby an aqueous slurry of said pentahydrate in said water is formed;

c. introducing 0.95–0.98 mole of 90–100 weight-% sulfuric acid over a period of at least 5 minutes and exothermically reacting said sulfuric acid with said pentahydrate to obtain mixture of sodium sulfate and boric acid;

d. maintaining the temperature of said mixing zone above 100° C. but below about 150° C. until a generally free-flowing, moist, particulate mixture is obtained; and e. drying the said generally free-flowing, moist, particulate mixture to a moisture content below about 20% by weight.

6. A method according to claim 5 comprising the additional step of packaging the product of said step (e), said product of said step (e) consisting essentially of 30–40% by weight $B_2O_3$, essentially as boric acid, and 30 to 40% by weight sodium sulfate, a 2 weight-% solution of said product in water having a pH at 23° C. which is greater than 7 but less than 8.

7. A method according to claim 5 wherein said method is carried out semi-continuously by means of the alternating use of a plurality of mixing zones.

8. A method according to claim 1, wherein said steps (a) and (b) are carried out substantially at the same time.

9. A method according to claim 2 wherein said steps (a) and (b) are carried out substantially at the same time.

* * * * *

UNITED STATES PATENT AND TRADEMARK OFFICE
CERTIFICATE OF CORRECTION

PATENT NO. : 4,156,654
DATED : May 29, 1979
INVENTOR(S) : James R. Blasius

It is certified that error appears in the above-identified patent and that said Letters Patent are hereby corrected as shown below:

Column 3, line 29, for "of" read --as--.
Column 9, line 34, for "accordng" read --according--.
Column 12, line 19, for "obtain mixture" read --obtain a mixture--.

Signed and Sealed this

Thirteenth Day of November 1979

[SEAL]

Attest:

RUTH C. MASON
Attesting Officer

LUTRELLE F. PARKER
Acting Commissioner of Patents and Trademarks